E. FAGAN.
FRUIT PACKING APPARATUS.
APPLICATION FILED JAN. 28, 1911.
990,717.
Patented Apr. 25, 1911.
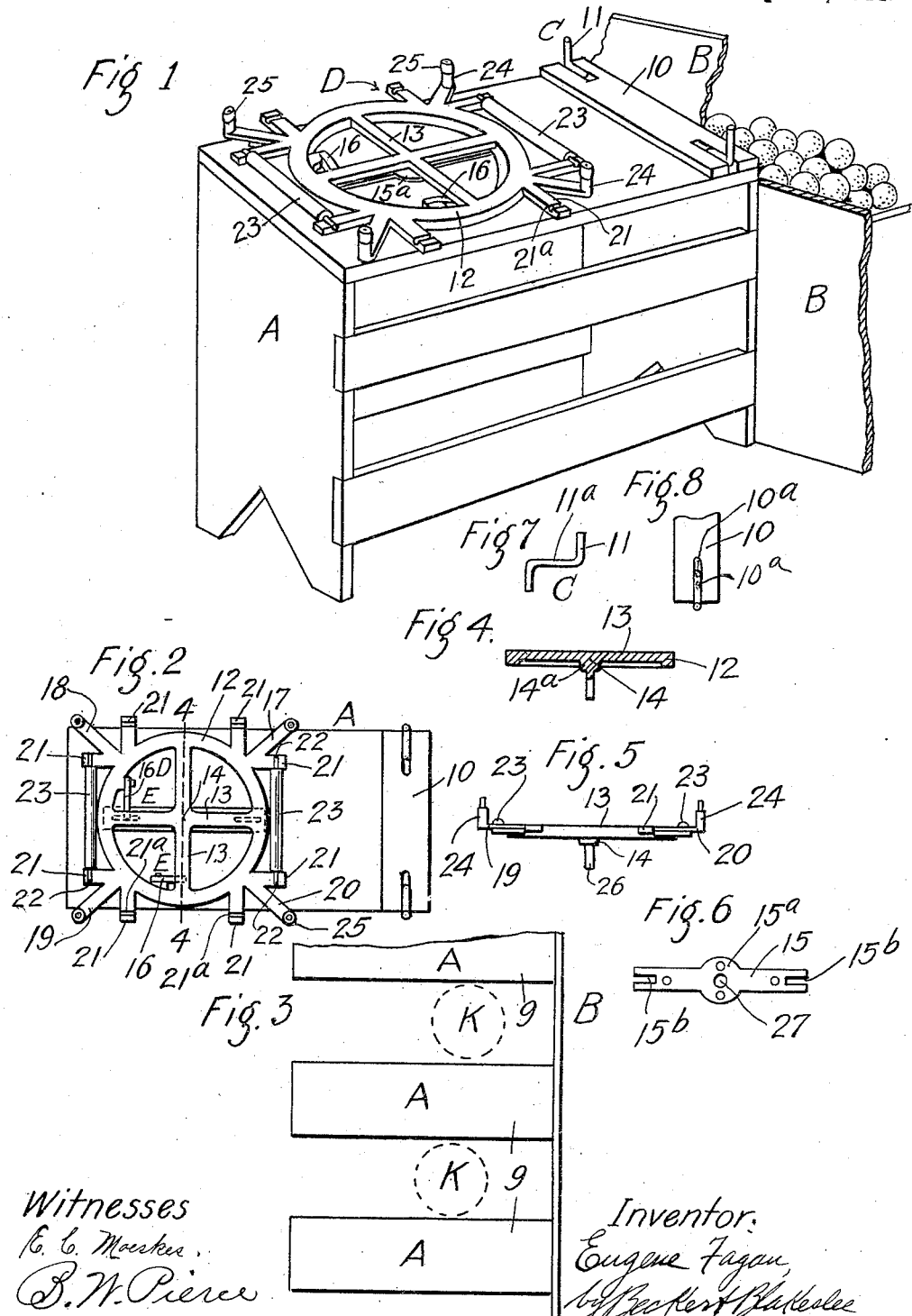

UNITED STATES PATENT OFFICE.

EUGENE FAGAN, OF WHITTIER, CALIFORNIA.

FRUIT-PACKING APPARATUS.

990,717.  Specification of Letters Patent.  Patented Apr. 25, 1911.

Application filed January 28, 1911. Serial No. 605,280.

*To all whom it may concern:*

Be it known that I, EUGENE FAGAN, a citizen of the United States, residing at Whittier, in the county of Los Angeles and State of California, have invented new and useful Improvements in Fruit-Packing Apparatus, of which the following is a specification.

This invention relates to fruit packing apparatus, and it has for its object to provide improvements in apparatus for use in connection with packing citrus fruits, and the like, which are customarily prepared for the market by being packed in double or partition boxes. It is customary to perform this step of the packing operation at a box stand, which is arranged in proximity to the bin of fruit, one end of the box upon the stand being first filled, the box being reversed end for end, and the other end being then filled. The end which is close to the bin has to be pushed away from it so as to clear the bin and the fruit therein when the box is turned around. To this end, the box has to be pushed or lifted or both, which is a laborious operation, and in reversing the box end for end unless it is forced away to the outer side of the packing stand, it is liable to strike the operator working upon the next adjacent stand.

According to the present invention, I provide means located adjacent to the outer side of the packing stand, that is the side farthest from the fruit bin, upon which the one end of the box rests while the other end is being filled, and upon which the box may be conveniently centered and turned about end for end, upon the far side of the packing stand, so as not to interfere with another operator, or come in contact with the bin or the fruit therein so as to block the turning operation. The said means are provided with rollers facilitating shifting the box upon the stand, and means are provided for holding the box in position upon the stand and preventing the undesired rotation or turning of the means upon which the end-for-end shift is accomplished.

The invention has for particular objects the provision of improved fruit packing apparatus of the general nature above stated which will be superior in point of relative simplicity and inexpensiveness of construction and organization, convenience in and positiveness of operation, facility of control, and adaptability to working conditions as at present found, and which will be generally superior in point of efficiency and serviceability.

With the above and other objects in view, the invention consists in the novel provision, combination, formation, association and relative arrangement of parts, members and features, all as hereinafter described, shown in the drawing and finally pointed out in claims.

In the drawing:—Figure 1 is an isometric view of a box stand to which is applied packing apparatus constructed and organized in accordance with the invention, a portion of a fruit bin and fruit therein being shown adjacent thereto; Fig. 2 is a top plan view of the box stand and packing apparatus shown in Fig. 1; Fig. 3 is a diagrammatic view illustrating the arrangement of a series of box stands such as shown in Fig. 1, and of the fruit bin, and showing the positions occupied by packing operators working at the stands; Fig. 4 is a detail transverse sectional view taken upon the line 4—4, Fig. 2, parts being omitted and parts being in full lines; Fig. 5 is a side edge view or side elevation of part of the apparatus shown in Figs. 1 and 2; Fig. 6 is a top plan or face view of a member of the apparatus which is directly connected with the box stand; and, Figs. 7 and 8 are detail views, 8 being fragmentary, of parts of stop means applied to the box stand as shown in Figs. 1 and 2.

Corresponding parts in all the figures are designated by the same reference characters.

Referring with particularity to the drawing A designates a box stand, and B a portion of a fruit bin, such as are employed in packing oranges and other citrus fruits. The box stand A has a slanting top portion 9, which is inclined toward the front, or toward the operator. At one side, namely that next to the bin B, the top portion or table 9 is provided with a raised or upwardly projecting cleat or strip 10, which ranges across the top thereof, from front to rear, and is provided with fingers 11 disposed adjacent to the end portions thereof, and constituting stop means C, with which one end of the box is engaged while being packed, the same end of the box resting upon the cleat or strip 10. The other end of the box rests upon a rotating base or turn table D which is disposed at or adjacent to the other end of the top portion or table 9 of the stand A. The turn table D comprises an annular frame or body 12 connected by radial spokes 13 joined by a central hub 14. The upper surfaces of the frame or body 12, of the spokes 13 and the hub 14 lie in the same plane, whereas the lower portions of the annular frame 12 and the hub 14 project slightly beneath the under plane of the spokes 13. The hub 14 rests upon and coacts with a base plate 15 which is secured upon the top portion 9 of the table, lying in a transverse plane thereof, and the hub 14 acts as a bearing upon the circular central portion 15$^a$ of the base plate, and either the hub or the base plate may be provided with a bearing, 14$^a$, which is shown as produced by adding an extra thickness to the hub 14. The end portions of the base plate 15 are provided with longitudinal notches or recesses 15$^b$ with, which coact stop means E carried by the turn table D, and consisting of pawls 16 connected with the annular frame 12 at points 90 degrees apart, whereby the turn table will lock in connection with the base plate upon each quarter turn of the turn table in the same direction. The ends of the pawls occupy the spaces under the adjacent spokes 13, and are thereby permitted readily to ride over the edges of the base plate, so as to enter the notches or recesses 15$^b$. From the annular frame 12 project four radial arms 17, 18, 19 and 20, which are so arranged that the arms 19 and 20 are spaced apart equally with the arms 17 and 18, and the arms 17 and 20 are spaced apart equally with the arms 18 and 19, but to a lesser extent than are the arms 17 and 18 and 19 and 20 spaced apart. This provides for accommodation between said pairs of arms of different sized boxes, such as those respectively used in packing oranges and lemons, the turn table D being given simply a quarter turn from the position in which it is usable for one width of box into the position in which it is usable for the other width of box. The two pawls 16 are thus arranged 90 degrees apart so that one of the same may always be in position for use when either wider or narrower boxes are used. Between the arms of each pair of arms are disposed spaced bearings 21, which are formed to receive and accommodate end bearings 22 upon rollers 23, the surfaces of which project slightly above the plane of the frame 12, hub 14 and spokes 13 of the turn table D. The end bearings 22 rest in bearing recesses 21$^a$, and the rollers 23 may readily be shifted from pair to pair of the bearings 21, so as to be brought into a path extending from side to side of the box stand at right angles to the cleat or strip 10, the surface of which is substantially flush with the upper portions of the rollers 23. Each arm 17 to 20 inclusive is provided at its outer end with an upwardly directed finger 24 which carries a roller 25, or rotating collar. The hub 14 is provided with a downwardly directed arbor or spindle 26 which rotatably enters a circular opening 27 in the central portion 15$^a$ of the base plate 15, and, if required, a registering opening in the top portion 9 of the box stand, so that the entire turn table is centered to turn upon the base plate, with which the hub portion 14$^a$ co-acts as a bearing.

The fingers 11 constitute the upper end portions of reversely hook-shaped bodies 11$^a$, one end of each of which is inserted in one of a plurality of openings 10$^a$ in the respective end of the cleat or strip 10. The fingers may thus be relatively adjusted to widen or diminish the space between them.

The operation, method of use and advantages of the improvements in packing apparatus constituting the invention will be readily understood from the foregoing description, taken in connection with the accompanying drawing and the following statement: A box to be packed or filled is placed upon the box stand A so as to rest at one end upon the turn table D and the rollers 23 thereof, and at the other end upon the cleat or strip 10 between the fingers 11 constituting the stop means C. Customarily a number of the box stands are arranged in a series, as shown in Fig. 3, with a side of each against the fruit bin B. Adjacent to the fruit bin and between two adjacent box stands the operator or packer takes his position, as shown in dotted lines at K in Fig. 3. When the end of the box adjacent to the fruit bin, or supported by the cleat or strip 10, is sufficiently filled, the box is pushed away from the bin and off from the cleat or strip 10, moving readily upon the rollers 23, so that the box may be reversed end for end by rotating the turn table 180 degrees in the direction indicated by the arrow in Fig. 1. The pawls 16 thereupon automatically lock the turn table against further movement, so acting with the notched ends of the base plate, 15 as to prevent the turn table from so rotating under gravity due to the inclined formation of the top portion 9 of the box stand. The end of the box to be filled in then drawn over on the cleat or strip 10, where the filling operation is completed. It will be seen that the turning of the box end-for-end takes place at the end remote from the fruit bin, and remote from the operator working at the next box stand. There is thus no interference or blocking in the operation. Also, as the box moves readily on the rollers, the reversal of the box is accomplished with ease. The stop means E, consisting of the pawls 16, come automatically into action in connection with the base plate 15, and hold the box against further turning, as do the stop means C consisting of the fingers 11. The arms 24 hold the box against displacement upon the stand and the turn table, and the rollers 25 upon said arms permit free movement of the box as it is being moved upon the turn table. If preferred, either the stop means C or the stop means E may be dispensed with, and the other used alone, although the lower finger 11 is always used.

The apparatus renders the packing operation much more convenient than heretofore, and a single operator can with facility manipulate the box without interference with the work of any other operator.

By setting the turn table D in proper position, the same may be used for either narrower or wider boxes, the parts being shown in the drawing in position for the use of narrower boxes.

I do not desire to be understood as limiting myself to the specific provision, construction, formation, combination, association and relative arrangement of parts, members and features shown and described; but reserve the right to vary the same, in adapting the improvements to varying conditions of use, without departing from the spirit of the invention and the terms of the following claims.

Having thus described my invention, I claim and desire to secure by Letters Patent:

1. A packing stand or the like provided with separate means for supporting a box, one of said means being rotary.

2. A packing stand or the like provided at one side with a fixed raised support and at the other side with a turn table.

3. A packing stand or the like, provided at one side with a fixed raised support and at the other side a turn table; together with stop means for the turn table.

4. A packing stand provided with separate means for supporting a box, one of said means having stop means co-acting with the box, and the other of said means being movable; together with stop means for said last named means.

5. A packing stand provided with a turn table, and means automatically locking the turn table against movement when given a quarter turn.

6. A packing stand having an inclined top portion, a turn table mounted thereupon, and means locking the turn table against rotation.

7. A packing stand provided with a turn table, and arms projecting from the turn table and provided with fingers projecting in positions to embrace a box resting upon the turn table.

8. A packing stand provided with a turn table, and arms projecting from the turn table and provided with fingers projecting in positions to embrace a box resting upon the turn table; the fingers being provided with rollers.

9. A packing stand provided with a turn table having anti-friction devices to receive and support a box.

10. A packing stand provided with a turn table and with a base plate, there being a bearing between the base plate and the turn table whereby the turn table is spaced from the base plate; and stop means arranged to extend between the turn table and the base plate.

11. A packing stand provided with a box support having stop means for holding the box in position; said stop means comprising relatively movable members; in combination with a movable support mounted upon the packing stand.

12. A packing stand provided with a turn table having separately employed means for holding in position thereon boxes of different dimensions.

13. A packing stand provided with a base plate having a recess, a turn table rotatably mounted upon the base plate, and stop means carried by the turn table and arranged to enter the recess in the base plate to lock the turn table against movement.

In testimony whereof, I have signed my name to this specification in the presence of two subscribing witnesses.

EUGENE FAGAN.

Witnesses:
RAYMOND I. BLAKESLEE,
C. P. WARDEN.